United States Patent
Bassols

(10) Patent No.: US 8,087,640 B2
(45) Date of Patent: Jan. 3, 2012

(54) FLOW VALVE FOR EXAMPLE FOR FAUCETS

(76) Inventor: Luis Bassols, Lomita, CA (US)

( * ) Notice: Subject to any disclaimer, the term of this patent is extended or adjusted under 35 U.S.C. 154(b) by 0 days.

(21) Appl. No.: 12/751,272

(22) Filed: Mar. 31, 2010

(65) Prior Publication Data

US 2010/0252115 A1    Oct. 7, 2010

Related U.S. Application Data

(60) Provisional application No. 61/165,887, filed on Apr. 1, 2009.

(51) Int. Cl.
*F16K 31/44* (2006.01)
(52) U.S. Cl. .................. 251/246; 251/155; 251/231
(58) Field of Classification Search .......... 251/231, 251/236, 242, 244, 245, 246, 339, 147, 155, 251/238, 78; 137/801, 562, 614.19; 4/678
See application file for complete search history.

(56) References Cited

U.S. PATENT DOCUMENTS

| | | | | |
|---|---|---|---|---|
| 161,768 A * | 4/1875 | Doherty | | 251/229 |
| 343,830 A * | 6/1886 | Miller | | 251/246 |
| 383,138 A * | 5/1888 | McHugh | | 251/246 |
| 1,269,451 A | 6/1918 | Jackson | | |
| 1,317,885 A | 10/1919 | Morris | | |
| 1,439,763 A | 12/1922 | Schaffer | | |
| 1,462,263 A | 7/1923 | Chaney | | |
| 1,837,552 A * | 12/1931 | Kelly | | 251/119 |
| 1,916,513 A | 7/1933 | Jones | | |
| 2,129,816 A * | 9/1938 | Byars | | 251/239 |
| 2,208,031 A | 7/1940 | Hooper | | |
| 2,247,590 A * | 7/1941 | Strong | | 251/238 |
| 2,330,176 A * | 9/1943 | Kahn | | 222/500 |
| 2,783,035 A | 2/1957 | Rosenberg | | |
| 2,820,577 A | 1/1958 | Winters et al. | | |
| 2,886,055 A * | 5/1959 | Davis | | 137/382 |
| 2,986,341 A | 5/1961 | Goodrie | | |
| 3,204,833 A | 9/1965 | Weitzner | | |
| 3,306,319 A * | 2/1967 | Kendt et al. | | 137/562 |
| 3,341,132 A | 9/1967 | Parkison | | |
| 3,451,705 A | 6/1969 | Turpen | | |
| 3,544,065 A | 12/1970 | Mercier | | |
| 3,659,754 A | 5/1972 | Barone et al. | | |
| 3,750,902 A | 8/1973 | Starrett | | |
| 3,891,180 A * | 6/1975 | Bebinger | | 251/120 |
| 4,018,292 A * | 4/1977 | Roll et al. | | 173/170 |
| 4,181,987 A | 1/1980 | Kesselman | | |
| 4,316,600 A * | 2/1982 | Parise et al. | | 251/245 |
| 5,154,138 A * | 10/1992 | Siddiqui et al. | | 119/72.5 |
| 5,290,008 A * | 3/1994 | Young | | 251/99 |
| 5,361,804 A | 11/1994 | Keller et al. | | |
| 6,058,971 A | 5/2000 | Palmer et al. | | |
| 6,370,713 B2 * | 4/2002 | Bosio | | 4/677 |
| 6,994,318 B2 | 2/2006 | Burke | | |
| 7,011,293 B2 * | 3/2006 | Chien et al. | | 251/236 |

* cited by examiner

*Primary Examiner* — John Fristoe, Jr.
*Assistant Examiner* — Andrew J Rost
(74) *Attorney, Agent, or Firm* — Henricks, Slavin & Holmes LLP

(57) ABSTRACT

A flow valve for faucets such as kitchen and bathroom faucets includes an inlet and outlet and a transverse valve mechanism where a valve element moves toward and away from a valve seat at least partly transverse to incoming inlet flow and/or outgoing outlet flow.

23 Claims, 6 Drawing Sheets

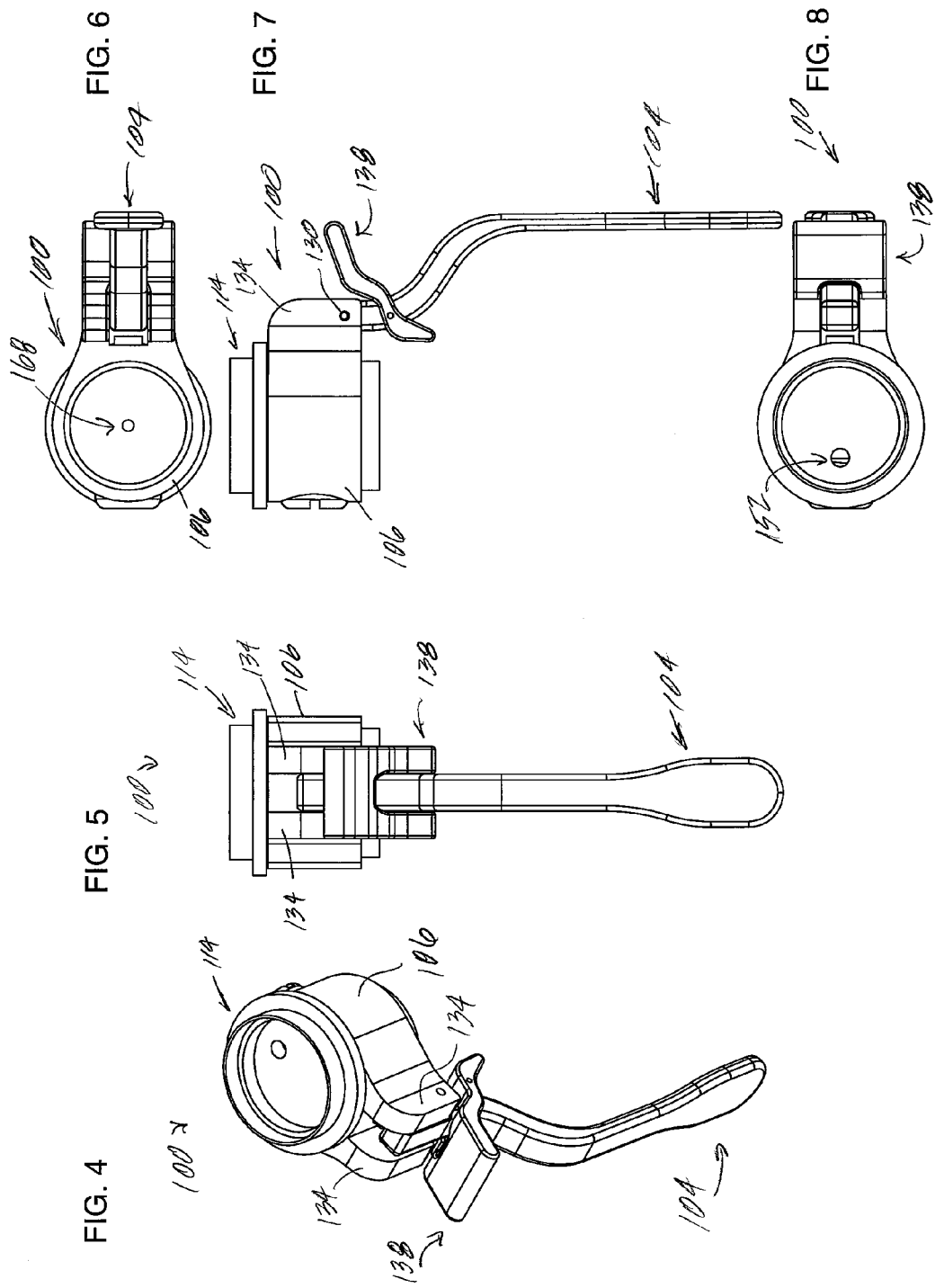

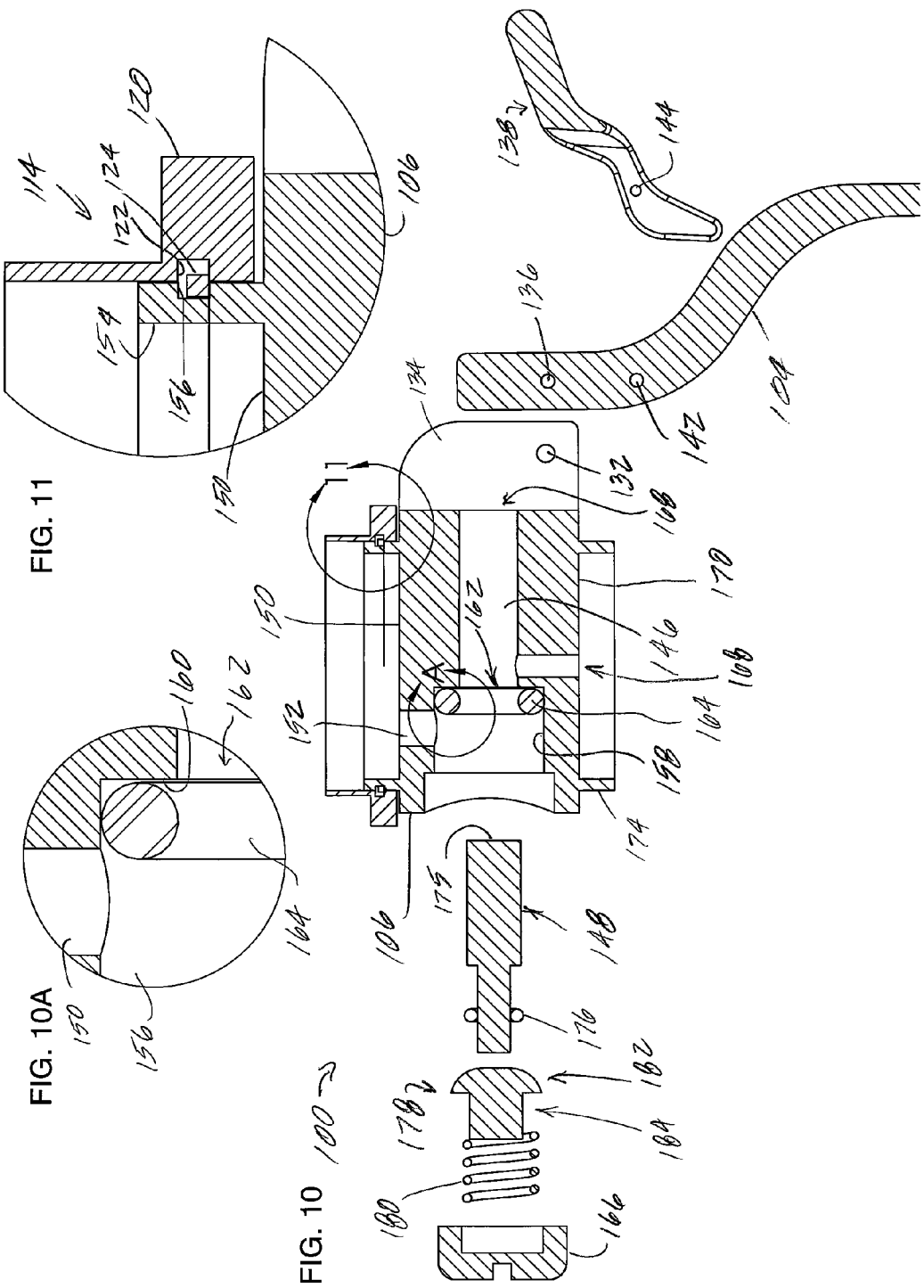

FLOW VALVE FOR EXAMPLE FOR FAUCETS

CROSS REFERENCE TO RELATED APPLICATIONS

This claims the benefit of non-provisional of 61/165,887 filed Apr. 1, 2009, incorporated herein by reference.

BACKGROUND

1. Field

This relates to valves, for example faucet valves, and also for example valves that do not require manual operation.

2. Related Art

Water usage continues to be an issue in many countries, and government agencies and private parties continue to promote conservation measures. Hygiene is also an issue requiring appropriate handwashing and other measures. One device that addresses both issues is an infrared sensor incorporated into faucets sensing demand for water, and supplying water upon demand without requiring handling of faucet valves. However, such sensors require special retrofit or replacement of existing faucets and appropriate electronics to delay shutting off the water until a selected time has elapsed. While conservation is promoted, there may be excess water consumption with such devices if the time delay is too long. Additionally, such devices typically lack an option for adjusting water temperature.

Manual devices requiring activation of a valve and having a spring or other bias for returning the valve to the closed position may include complicated configurations, provide insufficient water flow or pressure, or be difficult to assemble or maintain.

SUMMARY

A faucet flow valve and a method for operating a faucet flow valve are described. In one example, a faucet flow valve and a method for operating a faucet flow valve allowed the valve to open with a relatively short movement. In another example, fluid flow is provided with a relatively short actuation movement for example with a actuator element. In another example, higher fluid flow can be achieved with a smaller amount of actuation movement.

In one example of a valve and method of operation, a valve closure element is positioned in a valve body and partially transverse to the valve body. Transverse orientation in some cases permits smaller packages for operation and installation, and also shorter movement for producing a given flow relative to other configurations. Transverse orientation also helps to reduce the effects of water pressure and flow on movement of valve parts. A bias at least partly within the valve body biases the valve closure element against a valve seat. An actuator is accessible from outside the valve body and configured to move the closure element. In one example, the actuator is positioned vertically relative to the valve, or generally parallel to a central axis of the valve. The actuator can also be oriented in other directions. The closure element can be moved directly, or through contact with a valve stem or other element in contact with or capable of contacting the closure element. The valve body can be mounted to a faucet outlet, having a faucet outlet axis, and the valve body can have an inlet, and the inlet may be offset from the faucet outlet axis. The valve body Inlet can be offset from a valve body outlet. The valve body can also have a flow path, and part of the flow path between an inlet and outlet can extend transversely of the valve body.

In another example of a valve and method of operation, a valve closure element is positioned in a valve body and partially transverse to the valve body, and biased toward a valve seat. The closure element may be positioned downstream from a valve flow inlet. In one example, the closure element can include a head portion and a body portion, and the head portion may be convex, conical, hemispherical or other geometry. The closure element can be biased by a spring, a coil spring, a spring having a conical profile, or other form of bias construction. The valve seat may include an O-ring, and may be located downstream of an inlet to the valve body. The inlet may be an opening to a passageway in the valve body, and the valve seat may be adjacent a downstream opening of the passageway. The valve seat includes a sealing surface, for example a surface of an O-ring, and a sealing surface or the sealing element may interrupt a line between the downstream opening of the passageway and an opening for a fluid flow path downstream from the valve seat. In a further example, the inlet passageway may have a maximum cross-sectional distance and the valve closure element can be moved for opening the valve at least or approximately half the maximum cross-sectional distance. For example, if the passageway were circular in cross-section, the valve closure element can be moved at least half of the diameter. In another example, the valve closure element can be moved at least or approximately one quarter of the cross-sectional distance. In another configuration, the closure element can be moved by a structure moving on a diameter of the valve body, and in another configuration the closure element can be moved by a structure moving off a diameter of the valve body.

In a further example of a valve and method of operation, a valve control element moves at least partially transversely of an incoming water flow path, and is biased in transversely against a valve seat. In one example, the control element can be moved by a transversely-oriented valve stem or other actuator element against the force of the bias. The control element can include a valve seat contacting portion, which portion may be convex, hemispherical, conical, or other geometries.

In another example of a valve and method of operating, a valve closure element can be moved at least partially transversely of an axis between the faucet outlet and an outlet of the valve body. The closure element may be moved against a bias, such as one biasing the closure element against a valve seat. An actuator element can be operated to move the closure element against the bias. The actuator element can include a valve stem, which may also move at least partially transversely of the axis. They actually are element can include a handle or other element pivoting relative to the valve body.

These and other examples are set forth more fully below in conjunction with drawings, a brief description of which follows.

BRIEF DESCRIPTION OF THE DRAWINGS

FIG. 4 is an upper left rear of isometric view of the valve assembly of the FIG. 1.

FIG. 5 is a rear elevation view of the valve assembly of the FIG. 1.

FIG. 6 is a bottom plan view of the valve assembly of FIG. 1.

FIG. 7 is a right side elevation view of the found assembly of FIG. 1.

FIG. 8 is a top plan view of the valve assembly of FIG. 1.

FIG. 10 is an exploded view of the valve assembly shown in FIG. 9.

FIG. 10A is a detailed view of a portion of the section of FIG. 10.

FIG. 11 is a detailed view of a portion of the section of FIG. 10 showing coupling of a swivel ring and the valve body.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

The benefits of the present examples will become more apparent with consideration of the description of the examples herein. However, it should be understood that not all of the benefits or features discussed with respect to a particular example must be incorporated into a valve, component or method in order to achieve one or more benefits contemplated by these examples. Additionally, it should be understood that features of the examples can be incorporated into a valve, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of valve configurations and of methods of making and using the valves are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

It should be understood that terminology used for orientation, such as front, rear, side, left and right, upper and lower, and the like, are used herein merely for ease of understanding and reference, and are not used as exclusive terms for the structures being described and illustrated.

The present valve configuration can be used with a number of flow configurations. The valve configuration is relatively compact, requires little effort to operate, and can use a variety of component designs without significantly affecting water pressure or flow. While the present valve configuration can be used in a number of applications, the present description will focus on its use in conjunction with a home faucet, such as for a sink, for example kitchen or bathroom sinks. However, it should be understood that the valve configuration can be used in a variety of other fluid flow applications.

Figure 2:
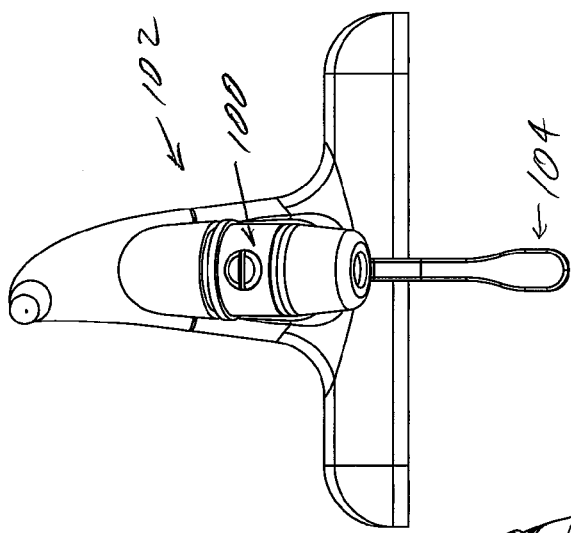
FIG. 2 is a front view of the combination shown in FIG. 1.
Figure 3:
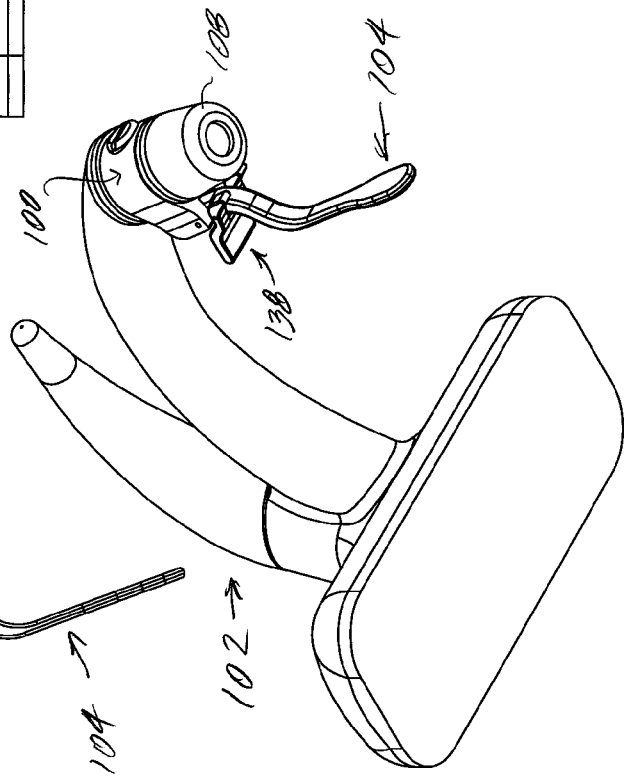
FIG. 3 is a lower left isometric view of the combination shown in FIG. 1.
Figure 1:
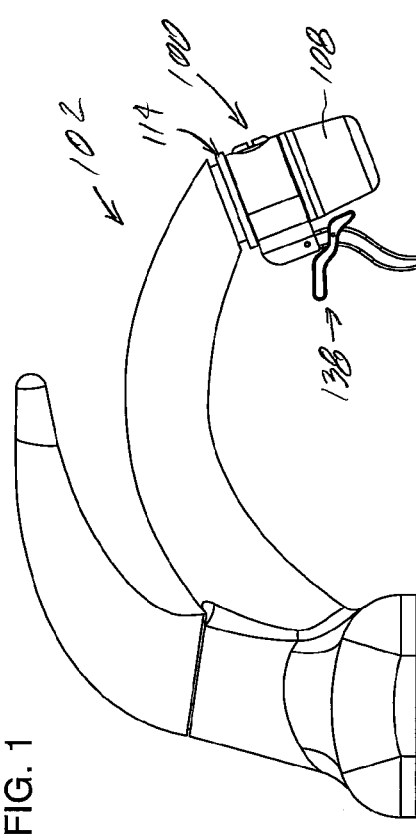
FIG. 1 is a side view of a faucet and valve showing the valve described herein.

In one configuration, a valve 100 for use with a faucet, such as the faucet 102 generically represented in FIGS. 1-2 (inlets not shown for simplicity), includes an actuating mechanism in the form of a trigger or lever 104 and a valve body 106 containing a valve mechanism, having components or parts described more fully below. Other components may be included or omitted, as desired, these other components being depicted in FIGS. 1-11 and 16 as a swivel ring 114 and an aerator 108 and a locking element 138. These other components can be omitted or included as desired, separately or altogether.

In the present examples, the aerator 108 is a conventional aerator assembly. The aerator may be threaded onto a lower portion of the valve body 106, for example using complementary threads, in a manner well known in the art.

The swivel ring 114 (FIGS. 1, 9, 10, 11 and 16) is an adapter for the valve. The swivel ring can take a number of configurations. In the present examples, the swivel ring includes a threaded portion represented schematically at 116 and 118 (FIGS. 10 and 11) for mounting the valve to a faucet. The threaded portion 116 in the present example includes external threads on a cylindrical wall of the swivel ring for mounting onto one form of faucet (having complimentary internal threads), and the threaded portion 118 forms internal threads on the cylindrical wall for mounting on another form of faucet (having complimentary external threads). The swivel ring also includes a flange 120 on the cylindrical wall that may include knurling or other textured surface for ease of manipulation and operation. An annular groove 122 (FIG. 11) is formed in the internal circumferential surface of the cylinder for receiving a spring clip 124 or other locking element for locking the valve relative to the swivel ring in an axial direction while still allowing rotational movement between the two structures. The spring clip 124 is generally square or rectangular in cross section with a cut to make it an incomplete circle or other configuration to allow the diameter to be adjustable during installation. The swivel ring can also take other configurations in order to adapt the valve to a faucet. It is also noted that the spring clip 124 can be other than square or rectangular in cross-section, and may be formed from spring metal.

The valve and swivel ring are assembled by placing the swivel ring over the adjacent end of the valve. The tolerances between the valve and the swivel ring are such that the outside surface of the valve adjacent to the swivel ring biases the spring clip 124 outward and deeper into the annular groove 122 so that the swivel ring and the spring clip can pass over the outside adjacent surface of the valve. When the spring clip 124 reaches a complementary groove 156 in the valve, part of the spring clip enters the groove 156 and substantially locks the valve and swivel ring axially. In one configuration, the spring clip can be normally biased outward into the swivel ring, and the spring clip and swivel ring mounted on to the valve. In another configuration, the spring clip can be biased outward and positioned on the valve in the groove 156, and then pressed inward into the groove 156 as the swivel ring 114 passes over the spring clip. The spring clip then relaxes outwardly into the groove 122 to lock the two axially. The valve easily pivots or rotates relative to the swivel ring. Other configurations are possible.

With the swivel ring 114 as shown and having internal and external threads on the upper cylindrical wall at 116 and 118, the valve can be positioned on a faucet having either male or female threads. The swivel permits the valve to be oriented in the desired configuration about a central spout axis extending through the swivel ring, the valve and the aerator 108 (as viewed in FIGS. 1-10).

Once the valve is assembled onto the faucet, such as faucet 102, the conventional valves incorporated into the faucet are configured to provide the desired flow volume and temperature during normal operation. The conventional valves can then be left in the selected configurations and the valve 100 used to operate the faucet and turn the flow on and off.

The lever 104 of the present valve is positioned on a side of the valve body 106, and in the present example has a portion, such as an actuator end portion 126, that is aligned with a diameter of the valve body. The lever 104 includes the actuator end portion within a groove or slot 128 on the outside of the valve body on a side of a pivot pin 130 opposite the lever arm which is accessible to the user for operating the valve. The pivot pin 130 extends through openings 132 (FIG. 10) in oppositely facing sidewalls 134 forming the groove or slot 128 and also extends through an opening 136 (FIG. 9) and supports the lever 104 so that the lever can pivot about the pin 130.

A locking arm 138 pivots about a pivot pin 140 relative to the lever 104. The pivot pin 140 extends through openings 142 and 144 (FIG. 10). The locking arm, when pressed downward as viewed in FIGS. 1, 7 and 9, brings the opposite end of the locking arm into contact with the surface of the aerator 108, thereby locking the lever 104 in position with the valve open allowing water to flow continuously until the locking arm 138 is released. When in the locked configuration, the locking arm 138 holds the accessible portion of the lever 104 outward (relative to the valve body), and the actuator end portion of the lever closer to the valve body 106, bearing against a valve stem to keep the valve open, as described more fully below. The lever arm can be positioned at any desired circumferential location of the valve body, with commensurate changes in the moving parts of the valve system. This flexibility arises from the valve body being approximately cylindrical with an axis generally aligned with the faucet outlet. Therefore, the working parts of the valve system can be oriented and positioned in a number of ways while still achieving one or more of the benefits described herein.

Considering the valve in more detail and its internal components (FIGS. 9-10), the valve includes a generally cylindrical valve body 106 with a pair of sidewalls 134 extending laterally of the body to support the lever 104, as described above. In the present example, the valve body 106 includes a central bore 146 extending along a diameter of the body completely through the valve body from a left side as viewed in FIG. 9 to a right side, at the slot formed by the side-walls 134. The central bore is substantially transverse to the incoming water flow and the outgoing water flow. The central bore extends out the side of the valve body adjacent the actuator end 126 of the lever 104 so that a valve pin or valve stem 148 can move easily in the central bore and contact the actuator end portion of the lever 104.

The valve body includes an upper surface 150 into which extends an inlet 152. In the present examples, the inlet is formed as a circular opening on an axis spaced apart from a central axis of the valve and a central axis of the faucet outlet opening, extending vertically as viewed in FIG. 9. In the present example, the opening axis, the valve central axis and the faucet outlet opening axis are parallel, and in the present examples generally perpendicular to the valve element. The size of the inlet can be selected as desired. A cylindrical wall 154 extends upward from the upper surface of the valve body 106 and forms the support structure for a groove 156 (FIG. 11). The cylindrical wall supporting the groove 156 in the present examples is a cylindrical wall extending 360°. The cylindrical wall extends upward a sufficient distance to adequately support the valve in the swivel ring 114, when the swivel ring is mounted to the faucet.

The inlet 152 extends completely through a wall of the valve body 106 from the upper surface to a counter bore 158 formed concentric with the central bore 146. The counter bore 158 is formed in and extends from the outside wall of the valve body to an annular base wall 160, which defines an opening 162 into the bore 146 (FIG. 10A). The base wall serves as a base for a seal ring, seal element, or contact surface, for example the O-ring 164, against which a closure element will contact for closing the valve to water flow. In the present example, the O-ring and base wall form a valve seat for the valve. The seal element can be an O-ring, flat washer seal, or other configuration.

In the present example, the axis of the inlet 152 will intersect the diameter that forms the axis for the central bore 146. However, it should be understood that the inlet 152 can be off center relative to the central axis of the central bore. However, it is desirable to ensure that the inlet 152 flows into the counter bore upstream from the seal element, O-ring 164, in the valve. It is also desirable in one configuration of the valve assembly to have the inlet 152 positioned relatively close to the seal element 164, without interfering with the integrity of the seal or valve seat. The relative position of the inlet 152 can be used to reduce the amount of incoming water that impacts or contacts the closure element. In the present examples, the central bore 146 is substantially right circular cylindrical, and the counter bore 158 is also substantially right circular cylindrical. The counter bore extends from an outside surface of the valve body to the bottom surface 160 internal to the valve body.

An entrance portion of the counter bore 158 is internally threaded for receiving a retaining and closing cap 166 having complimentary threads. The cap closes counter bore and also keeps water from flowing from the valve out the opening of the counter bore. The cap also retains the biased closure element, described more fully below. The cap may include a slot or other configuration for installing the removing the cap.

The bottom or base surface 160 of the counter bore 158 surrounds and defines the opening to the central bore 146 and forms a base or seat against which the O-ring 164 is to be seated. The internal diameter of the counter bore is preferably slightly smaller than the relaxed outer diameter of the O-ring 164 to form a good seal between the counter bore and the O-ring. The bottom surface of the counter bore in the present examples is positioned axially along the diameter of the central bore between the threads for the cap 166 and the central vertical axis of the valve body.

The central bore 146 extends from the bottom of the counter bore 158 along the diameter to an opening 168 facing the actuating end portion 126 of the lever 104. In the present example, therefore, the central bore extends completely through the valve body on a diameter.

An outlet 168 extends from the central bore 146 to a lower surface 170 of the valve body 106. The outlet 168 in the present examples is a bore 172 (FIG. 9) centered in the valve body with a substantially circular cross-section forming a cylindrical outlet and defining a central axis coaxial with the vertical axis of the valve body. However, it should be understood that the outlet 168 could be off the central axis. In the present examples, the outlet has a cross-sectional area smaller than that for the inlet, but they can be the same as well, or the outlet can be larger.

Figure 9:
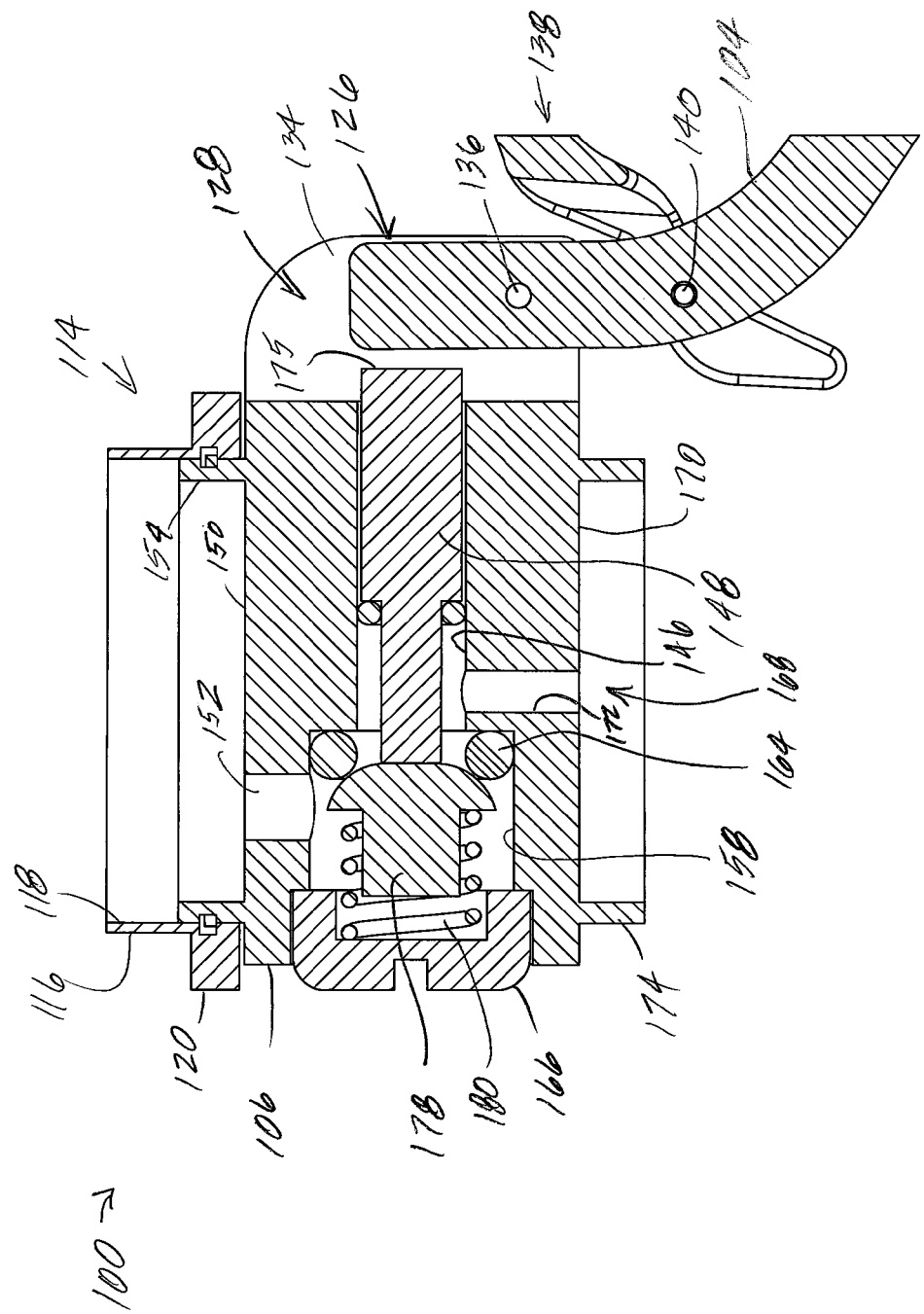
FIG. 9 is a sagittal section and partial cutaway view of the valve assembly of FIG. 1.

A substantially cylindrical wall 174 extends downwardly as viewed in FIGS. 9 and 10 from the lower surface 170 of the valve body 106. The wall 174 is externally threaded to accept and provide a support for the aerator 108. In the present examples, the cylindrical wall is coaxial with the central vertical axis of the valve body.

Other moving portions of the valve besides the lever 104 include the valve stem or pushrod 148 extending within the central bore 146. The right end or anvil portion 175 of the valve stem (as viewed in FIG. 9) is closely adjacent the actuator end portion of the lever 104 (FIGS. 9 and 10), and the left end of the valve stem is adjacent the O-ring 10. When the valve is off, the valve stem and lever 104 may be configured so that the anvil portion may contact each other, or they may be spaced apart in their relaxed positions or when the valve is closed. In the present example, the left end of the valve stem is within the envelope of the O-ring. The left end of the valve stem includes a reduced diameter portion for receiving an O-ring 176 (FIG. 10) for sealing the valve stem within the central bore 146. The O-ring 176 can also be positioned at other locations along the valve stem, for example on the larger diameter portion of the valve stem, closer to the actuator end of the lever 104. The valve stem can also include an O-ring groove (not shown) for receiving and helping to reliably position the O-ring.

A valve element or closure element 178 contacts and rests against the valve seat, in the present example the O-ring seal 164, under the bias of a coil spring 180 positioned between the valve element 178 and the cap 166. The spring 180 is sized to fit within a bore in the cap 166 and around a reduced diameter shaft of the valve element 178. The head of the valve element in the present examples is rounded similar to a hemisphere. In the present example, the valve element 178 includes a head portion 182 and a body portion 184. The head portion contacts the valve seat to close the valve. The head portion is also contacted by the valve stem 148 in order to allow opening of the valve through the lever 104. In the present example, the head portion has a convex configuration or geometry, and includes a relatively flat portion in the center where the head portion is contacted by the valve stem 148. The convex geometry follows a substantially circular profile to the proximal end of the head portion, where it meets the body portion 184. In one example, the head portion is substantially circular in transverse cross-section and has a maximum dimension, in the present example a diameter, greater than the inside diameter of the O-ring 164 and less than the outside diameter of the O-ring. In one example, the cross-sectional thickness of the O-ring is X, and the diameter of the head portion is approximately the inside diameter of the O-ring plus one half X. In another example, the head portion diameter is less than the inside diameter of the O-ring plus one half X and in another example is greater than the inside diameter of the O-ring plus one half X. The head portion diameter may be selected as a function of the stability of the valve element 178 during operation, the size or diameter of the body portion 184 and the diameter of the spring or other bias and how the spring contacts the underside of the head portion. With a larger body portion diameter and spring diameter, the movement of the valve element can be more stable. The head portion can take other configurations as well, including for example but not by way of limitation those described herein.

The body portion 184 of the valve element 178 has a length sufficient to allow the valve element to be reliably positioned in the counter bore 158 with the spring 180 biasing the valve element against the valve seat. The length can be selected so as to accommodate the expected travel of the valve stem 148 without contacting the cap 166. Alternatively, the length can be selected so that the valve element contacts the cap 166 when the valve is opened, thereby stopping the travel of the valve stem 148. The diameter of the body portion can be selected to be slightly less than the inside diameter of the spring 180, for example so that the valve element does not move appreciably within the spring envelope. The body portion diameter can be significantly less than the inside diameter of the spring, if desired.

The distal end of the spring 180 bears against the proximal portion of the valve element head portion, and biases the valve element into the valve seat and toward the left end of the valve stem 148. The spring 180 is a conventional coil compression spring. The spring is selected so as to allow relatively easy opening of the valve while still being strong enough to reliably bias the valve element against the valve seat and securely close the valve against leakage. The coil spring diameter can be selected large enough to reduce any tendency of the coil spring and/or valve element to bend away from their normal axis. A further consideration for the coil spring diameter includes reliably positioning the coil spring in the cap 166 without allowing appreciable lateral movement of the spring. Another consideration for the coil spring diameter is to have the spring reliably contact the underside of the head portion 182 and reliably seat against the O-ring 164. In other configurations, the coil spring can have a conical configuration, or the spring can be a leaf spring, helical spring or other bias configuration. The spring configuration can also be selected as a function of the valve element configuration.

In operation, the lever 104 is pushed backward, in the present examples, or to the right in FIG. 9, and bears against the right end 175 of the valve stem 148. As the lever 104 is pushed, the valve stem 148 moves further into the valve body 106 (to the left as viewed in FIG. 9) and pushes the valve element 178 against the spring 180. As the valve element 178 is pushed, the head of the valve element moves away from the O-ring 164, thereby allowing water to flow from the counter bore, into the central bore and through the outlet 168. If the valve stem remains depressed by the lever 104, water continues to flow into the inlet 152, into the counter bore 158, and the central bore and out the outlet 168. Locking the locking element 138, when set, keeps the valve stem depressed and water flowing through the valve.

The horizontal arrangement or flow-transverse arrangement of the valve assembly and components within the valve body 106 allow very short travel distances for the valve stem to open the valve. The valve stem, for example, and the valve seat, are oriented transverse to the water flow inlet to the valve body and transverse to the water flow out of the aerator. Similarly, a relatively short travel distance for the actuator end of the lever 104 permits easy actuation of the valve for full flow with a relatively short travel distance. Additionally, depending on the position and configuration of the valve sealing arrangement, such as the valve seat and valve element 178, fluid flow past the valve seat can be improved over other configurations.

Figure 12:
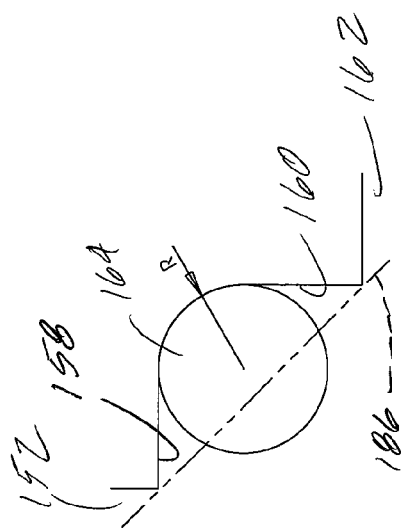
FIG. 12 is a schematic of a detailed view similar to that of FIG. 10A representing a possible design consideration for a valve such as that shown in FIG. 1.

The valve seat can take a number of configurations to achieve the closure or sealing function provided by the O-ring and the valve closure. For example, as represented in FIG. 12, the counter bore 158 can join the base wall 160 through a radiused transition, for example having a radius R. In the example shown in FIG. 12, the radius conforms to the radius of the O-ring and provides a larger sealing area between the O-ring and the valve body. Also in the example shown in FIG. 12, the valve seat including the O-ring 164 is positioned sufficiently close to the inlet passageway 152 that it interrupts or breaks a line 186 passing between the adjacent wall of the inlet 152 to the adjacent wall of the channel 162. In one configuration, it is desirable to have the O-ring 164 interrupt as little of the line 186 as possible, for example to reduce any impediment to fluid flow presented by the O-ring. In the configuration shown in FIG. 12, less than 50% of the O-ring crosses the line into the counter bore. The valve seat can even be configured so that none of the O-ring crosses the line. Conversely, if none of the O-ring crosses the line, the valve element 178, in the configuration shown in FIG. 12, would have to extend farther past the inlet 152 than otherwise to seal against the valve seat and close the valve. In such a configuration, the valve stem would have a longer travel distance to move the valve element to the same position it otherwise would be in with a thicker O-ring, or more of the valve element would be positioned under the inlet 152, thereby providing a greater impediment to flow than would occur if the valve element were pushed further to depress the spring more.

Figure 15:
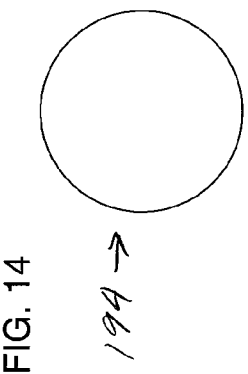
FIG. 15 is another valve element alternative to that shown in FIG. 15.
Figure 14:
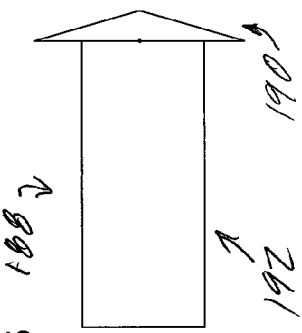
FIG. 14 is a valve element alternative to that shown in FIG. 10.
Figure 16:
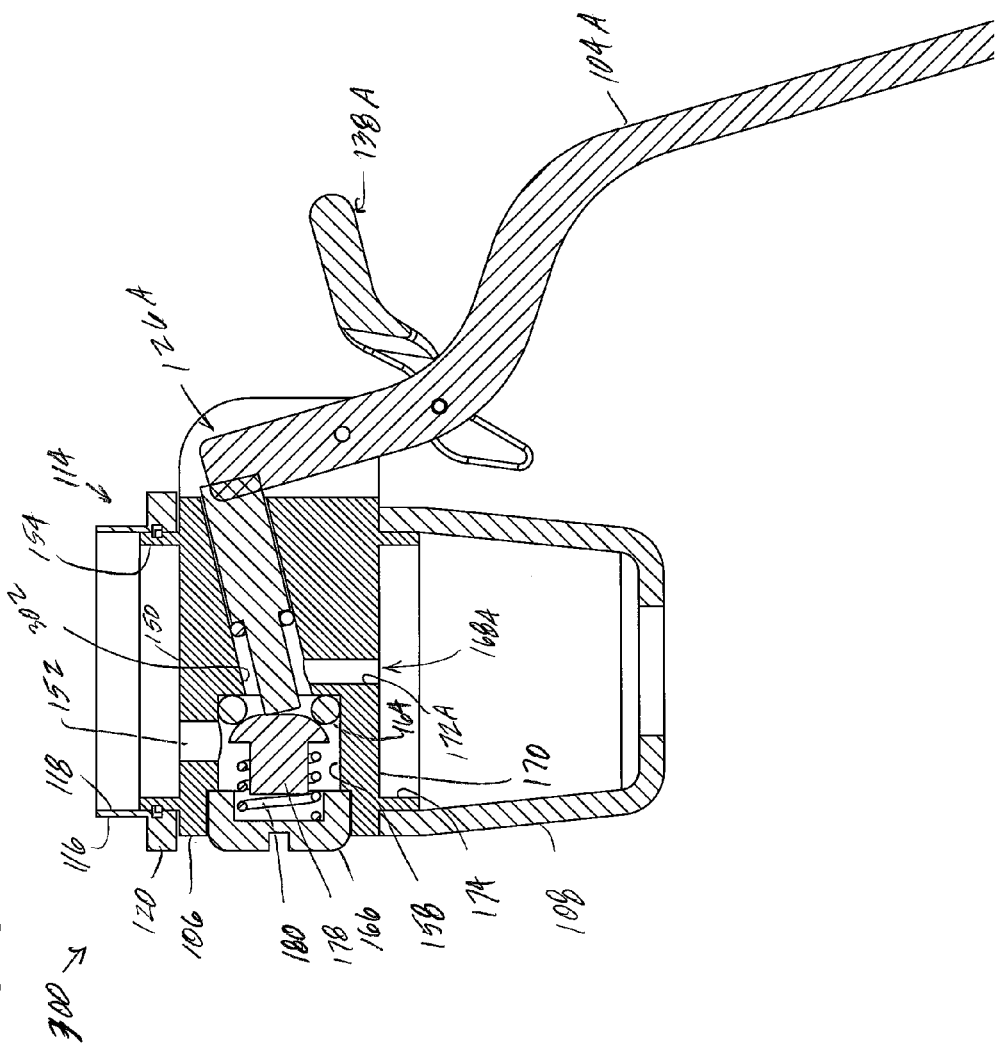
FIG. 16 is a sagittal section and partial cutaway view of a valve assembly alternative to that shown in FIG. 10 along with an aerator and a swivel ring.

The valve can also be designed to minimize the impediment to flow presented by the valve element 178. For example, the head portion 182 of the valve element can be configured to produce a small side profile when viewed from the direction of the inlet 152. For example, a valve element 188 (FIG. 15) can have a head portion 190 on a body portion 192 that presents a low side profile from the distal-most point of the head portion to the proximal-most point of the head portion. This can be achieved with a shallow conical head portion or even a flat plate, or with other geometries. However, with a head portion such as that shown in FIG. 15 having a low side profile, it is possible that more water will flow behind the head portion for a given length of travel for the valve stem 148. This result can be minimized by increasing the travel made by the valve stem, in other words pushing the valve stem further into the valve body. In any case, any flow impediment produced by the valve element 178 can be reduced by pushing the valve element further into the cap 166, for example beyond a projection of the inlet wall. In another example, the valve element can be a sphere 194 (FIG. 14). The sphere presents a smooth flow surface but a relatively larger flow impediment. In this configuration, the valve element can be biased with a larger diameter compression spring to ensure that the ball is centered in the counter bore.

In another example, a valve element 196 (FIG. 13) can include a head portion 198 and a body portion 200 that is formed or made integral with the valve stem 202. The spring or other bias element bears against the proximal surface 204 of the head portion and the opposite face 206 of the combination serves as the anvil surface for the upper portion 126 of the lever 104. Additionally, any of the valve elements that can be used to seat against the valve seat can be joined to or made integral with a valve stem.

In a further example, a valve assembly 300 (FIG. 16) may have the central axis for a valve stem bore 302 and the central axis for the counter bore 158 intersect the vertical central axis of the valve body, but the valve stem bore may be off a diameter. For example, the central axis for the bore and the counter bore can extend from the left, as viewed in FIG. 16, and the valve stem bore may extend upward and to the right to meet the upper portion 126A of the actuator end of the lever 104A when the lever is moved to open the valve (for example as depicted schematically in FIG. 16 by showing the lever overlapping part of the valve stem—they ordinarily would not overlap, but movement of the lever to the position shown in FIG. 16 would move the valve stem along the bore 302. This configuration reduces further the length of travel to actuate the valve. The valve stem and the valve element head portion can be designed to minimize any tendency of the valve element to move off its axis laterally.

Valves according to the present examples can be easily installed on conventional faucets, including those used in kitchens, bathrooms, and the like. The lever can be easily activated with the user's hand, wrist, arm or other element for starting the flow. Additionally, the valve can be made smaller than conventional valves and used on smaller faucets such as small bathroom faucets. The valves can eliminate the constant use of the conventional valves incorporated as part of the original faucet, and the conventional valves can remain open and set to the user's desired mixture of hot and cold water. This can also reduce the wear on the conventional valves. The threads and the adapter can be used to permit the valve to be installed on almost any kitchen or bathroom faucet, and a swiveling adapter can be used, if desired, to position the valve and lever 104 in the desired position. The valves can also be used on dispensers such as drinking water dispensers and the like. The valves also improve hygiene, and improve conservation.

Figure 13:
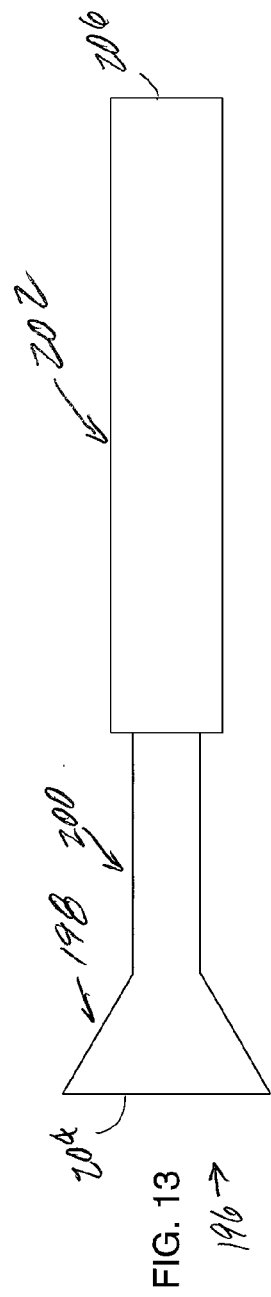
FIG. 13 is a schematic of a valve stem alternative to that shown in FIG. 10.

In other examples, a coil spring in the shape of a cone can be used to help center the valve element. In further examples, the valve element can have a conical head, with or without a valve body about which the bias spring can extend. Additionally, with any of the valve elements described herein, the valve seat or base of the counter bore can take a number of configurations, including flat as shown in the Figures, rounded in cross-section to conform to the surface of an O-ring as shown in FIG. 12, conical so as to be shaped like a funnel converging into the central bore, or other shapes. In other examples, the valve stem and the valve element can be a single element as shown in FIG. 13, for example having a conical-shaped head formed or attached at the left end of the valve stem, with the spring bearing against the base of the cone. In another example of a valve stem, the valve stem 148 may include a groove for accommodating the O-ring 176 or be sealed in other ways. In another example, the cap may include a seal element, for example an O-ring or other seal, to seal the counter bore against leaking. The cap can also be flat rather than cup-shaped. Materials for the valve assembly can be conventional for commercial and household faucets and accessories.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:
1. A faucet flow valve comprising:
a valve body having an inlet and an outlet;
a valve closure element partly in the valve body and at least partially transverse to the valve body and wherein the valve closure element is movable longitudinally in a first direction within the valve body;
a valve seat in the valve body for receiving the closure element configured to close the valve when the closure element contacts the valve seat;
a bias element biasing the valve closure element longitudinally toward the valve seat; and an actuator element accessible from outside the valve body at a side portion of the valve body opposite the valve closure element and movable in a direction non-parallel to the first direction and configured to move the valve closure element; and wherein the flow valve includes a valve connection element for connection to a faucet and a flow area in the valve connection element for water to flow from the faucet to the valve body inlet, wherein the flow area includes a central axis, and wherein the inlet is offset from the central axis.

2. A faucet valve comprising:

a valve body having an inlet in a flow path from a water outlet of a water source and wherein the inlet defines a flow axis, and a valve outlet from the valve body and a second flow path from the inlet to the valve outlet, and wherein the valve body further includes a valve body side spaced laterally from the flow axis and from the valve outlet, a valve seat in the second flow path, and a valve control element in the second flow path and configured to move at least partly transversely of the flow axis into and out of contact with the valve seat;

a valve stem extending in a direction non-parallel to the valve control element from a position adjacent the valve control element to the side of the valve body opposite the valve control element, and a valve actuator element coupled to the valve body at a pivot point and including a portion extending to a first side of the pivot point to a manually accessible portion usable by a user to actuate the valve and a portion extending to a second side of the pivot point different than the first side for contacting the valve stem.

3. The valve of claim 2 wherein the valve outlet is substantially centered with respect to the valve body.

4. The valve of claim 2 wherein the valve control element is below the inlet.

5. The valve of claim 2 wherein the valve control element includes a head portion and a body portion.

6. The valve of claim 5 wherein the head portion is at least partially convex.

7. The valve of claim 5 wherein the head portion is at least partially conical.

8. The valve of claim 5 wherein the head portion is at least partially hemispherical.

9. The valve of claim 5 wherein the body portion extends away from the head portion toward the bias element.

10. The valve of claim 2 wherein the valve seat includes an O-ring.

11. The valve of claim 10 wherein the O-ring has an outside diameter and an inside diameter and wherein the valve control element has a portion contacting the O-ring having a maximum dimension greater than the inside diameter and less than the outside diameter.

12. The valve of claim 11 wherein the difference between the outside diameter and the inside diameter is a value X and wherein the maximum dimension is less than the sum of the inside diameter plus one half X.

13. The valve of claim 2 wherein the valve seat is downstream from the inlet.

14. The valve of claim 13 wherein the inlet opens into a passageway and the valve seat is adjacent the passageway.

15. The valve of claim 14 wherein the valve seat interrupts a line between the passageway and an opening downstream from the valve seat.

16. The valve of claim 2 wherein the valve stem is between the closure element and the actuator element.

17. The valve of claim 16 wherein the valve stem is not on a diameter of the valve body.

18. The valve of claim 17 wherein the valve stem extends downward from an outside of the valve body to an inside of the valve body.

19. The valve of claim 2 further including a bias element for the valve control element.

20. The valve of claim 19 wherein the bias element is a spring partially around a portion of the closure element.

21. The valve of claim 20 wherein the spring is a coil spring.

22. The valve of claim 2 wherein the valve is mounted to an outlet of a faucet.

23. A method for operating a faucet valve comprising:

actuating manually with a handle element on an actuator a valve closure element from outside a valve body containing at least part of the valve closure element wherein the actuator is pivotally coupled to the faucet valve and the handle element extends to one side of a pivot point and a valve actuator element extends on another side of the pivot point;

moving with a valve stem the valve closure element in a first direction at least partly transversely of an axis between a faucet outlet and an outlet of the valve body and against a bias to open a valve in the valve body wherein the valve stem moves longitudinally in a direction non-parallel to the first direction upon being pressed by the actuator element;

allowing water to flow from the faucet outlet through the valve body and out the valve body outlet; and releasing the valve closure element and allowing the bias to move the closure element to a valve seat and close the valve.

* * * * *